(12) United States Patent
Brand et al.

(10) Patent No.: US 10,039,239 B2
(45) Date of Patent: Aug. 7, 2018

(54) METHOD AND APPARATUS FOR CONTROLLING THE OPERATION OF A STUMP CUTTER

(75) Inventors: Ivan R. Brand, Holland, MI (US); Brent Allen Bartels, Pella, IA (US); John R. Powers, Morgantown, WV (US); Douglas E. Ammons, Morgantown, WV (US)

(73) Assignee: VERMEER MANUFACTURING COMPANY, Pella, IA (US)

( * ) Notice: Subject to any disclaimer, the term of this patent is extended or adjusted under 35 U.S.C. 154(b) by 1119 days.

(21) Appl. No.: 12/182,025

(22) Filed: Jul. 29, 2008

(65) Prior Publication Data

US 2009/0090434 A1 Apr. 9, 2009

Related U.S. Application Data

(60) Provisional application No. 60/962,804, filed on Jul. 31, 2007.

(51) Int. Cl.
*A01G 23/06* (2006.01)
*B23Q 16/00* (2006.01)
(Continued)

(52) U.S. Cl.
CPC .................................. *A01G 23/06* (2013.01)

(58) Field of Classification Search
CPC ...... A01G 23/06; A01G 23/04; A01G 23/062; A01G 23/067; B23Q 15/00; B23Q 16/00; B27B 1/00
(Continued)

(56) References Cited

U.S. PATENT DOCUMENTS 1,447,908 A 3/1923 Staude
2,912,022 A 11/1959 Ver Ploeg et al.
(Continued)

FOREIGN PATENT DOCUMENTS

EP 0 977 363 A2 2/2000
EP 1 712 418 A2 10/2006
(Continued)

OTHER PUBLICATIONS

International Search Report and Written Opinion dated Dec. 29, 2008 from International Application No. PCT/US2008/071613.
(Continued)

*Primary Examiner* — Justin V Lewis
(74) *Attorney, Agent, or Firm* — Merchant & Gould P.C.

(57) ABSTRACT

A stump cutter controller and operator presence system includes one or more capacitive sensors in each of the three control levers that control movement of the cutter wheel. A sensor circuit measures changes in the capacitance of the sensors. The controller automatically disengages a drive clutch and applies a brake to the cutter wheel when the controller senses that an operator has left the operating station—which is assumed when the operator has not touched any one of the three control levers of the operator station for a predetermined time. The controller logic is set to allow the clutch to remain engaged during a delay period, of predetermined duration, to permit the operator to move a hand off of one control lever to another control lever. Also, a grace period, of varying duration based on the speed of the cutter wheel, may be provided during which the clutch is reengaged if an operator returns to the controls.

18 Claims, 6 Drawing Sheets

(51) Int. Cl.
*B23Q 15/00* (2006.01)
*B27B 1/00* (2006.01)

(58) Field of Classification Search
USPC .............................. 144/24.12, 334, 356, 382
See application file for complete search history.

(56) References Cited

U.S. PATENT DOCUMENTS

| | | | | |
|---|---|---|---|---|
| 3,336,958 A | * | 8/1967 | Carlton | A01G 23/067 144/24.12 |
| 3,783,914 A | * | 1/1974 | Daugherty | A01G 23/067 144/235 |
| 4,117,651 A | | 10/1978 | Martin, Jr. | |
| 4,223,775 A | | 9/1980 | Lloyd | |
| 5,368,532 A | * | 11/1994 | Farnet | 482/5 |
| 5,620,077 A | | 4/1997 | Richard | |
| 5,746,261 A | * | 5/1998 | Bowling | A01B 13/00 144/24.12 |
| 5,801,340 A | | 9/1998 | Peter | |
| 5,847,690 A | | 12/1998 | Boie et al. | |
| 6,014,996 A | * | 1/2000 | Egging | A01G 23/067 144/334 |
| 6,026,871 A | * | 2/2000 | Chapman | A01G 23/067 144/24.12 |
| 6,501,281 B1 | | 12/2002 | Rundo | |
| 6,590,171 B1 | | 7/2003 | Wolf et al. | |
| 7,154,393 B2 | | 12/2006 | Okushima et al. | |
| 7,795,882 B2 | * | 9/2010 | Kirchner | H03K 17/962 324/672 |

FOREIGN PATENT DOCUMENTS

| | | |
|---|---|---|
| GB | 2 005 422 A | 4/1979 |
| WO | WO 89/08352 | 9/1989 |

OTHER PUBLICATIONS

SC60TX Stump Cutter Operator's Manual, SC60TX_01_03, Order No. 105400V64, 92 pages, © 2004, Vermeer Manufacturing Company.
SC60TX Stump Cutter Operator's Manual, SC60TX_02_03, Order No. 105400Y38, 86 pages, © 2008, Vermeer Manufacturing Company.
SC60TX Stump Cutter Maintenance Manual, SC60TX_m1_01, Order No. 105400V66, 71 pages, © 2003, Vermeer Manufacturing Company.
SC60TX Stump Cutter Maintenance Manual, SC60TX_m2_03, Order No. 105400Y40, 82 pages, © 2006, 2007, Vermeer Manufacturing Company.
SC60TX Stump Cutter Parts Manual, SC60TX_P1_03, Order No. 105400ZDG, 155 pages, © 2004, Vermeer Manufacturing Company.
SC60TX Stump Cutter Parts Manual, SC60TX_P2.07, Order No. 105400ZHF, 138 pages, © 2006-2008, Vermeer Manufacturing Company.
International Search Report and Written Opinion dated Nov. 20, 2008 from International Application No. PCT/US2008/071608.
2004 Vermeer SC252, Stump Grinder, Printed on Nov. 11, 2014, 2 Pages.
Vermeer, 252 Stump Cutter, Operator's Manual, Jul. 1996, 140 Pages (see section 10).
Truini, Popular Mechanics Do-It-Yourself Tree Stump Grinding, Dec. 7, 2004, 5 Pages.

* cited by examiner

METHOD AND APPARATUS FOR CONTROLLING THE OPERATION OF A STUMP CUTTER

CROSS REFERENCES TO RELATED APPLICATIONS

This application claims the benefit of U.S. Provisional Application No. 60/962,804, filed Jul. 31, 2007, the disclosure of which is hereby incorporated by reference.

FIELD OF THE INVENTION

The present invention relates generally to stump cutters; more specifically to an apparatus and method for controlling the operation of a stump cutter; and more specifically still to inhibiting the operation of a stump cutter by monitoring a plurality of operator handles to detect operator presence.

BACKGROUND OF THE INVENTION

Stump cutting machines are well known for removing undesirable tree stumps. Such machines include a rotating cutter wheel driven by a gas or diesel engine. The cutter wheel, while rotating, is advanced toward the stump and moved laterally across the face of the stump. The cutter wheel is mounted at one end of a boom which is, in turn, pivotally mounted on a support frame. Hydraulic boom swing cylinders are used to pivot the boom about the pivot point to move the cutter wheel back and forth across the face of the stump to cut it away. The hydraulic boom swing cylinders are controlled by a control lever handle. Other handles control advancing the cutter wheel into the stump (e.g., in and out) and up/down. Further, the handles can be used to provide an additional function, namely determining operator presence.

Operator Presence Systems (OPS) are also known in the art. Typically, the systems include two main components: a sensor system activated by an operator when physically located at an operating station, and deactivated when the operator leaves the operating station; and a control system that disables a powered element of the machine when the sensor system is deactivated.

In the case of a stump cutter with hydraulic cutter wheel positioning controls, the effectiveness of an OPS is influenced by the configuration of the controls and the configuration of the operator station. More specifically, operation of the stump cutter requires activation of three machine movements that can be described as corresponding to an x, y, z axis system, including:

- x-direction: sweep control can generally be described as a first direction generally parallel to the ground. The cutter wheel is typically moved by pivoting a support arm about an axis of rotation. Although this movement is generally not linear, it can be generally described as movement in a first direction;
- y-direction: movement of the complete machine, forwards or backwards, can be described as a second direction, also generally parallel to the ground, and described as movement in the y-direction; and
- z-direction: raising or lowering the cutter wheel can generally be described as the third direction (e.g., the z-direction).

These three movements are provided by 3 separate control levers which the operator controls using both hands. The swing control is used almost constantly with one of the operator's hands while the other functions are subject to frequent, intermittent and sometimes simultaneous use with the other hand for proficient operation.

Operator stations and control requirements on other types of machines that commonly utilize an OPS typically do not pose such unique challenges. For instance, ride-on machines typically use a sensor which simply relies upon body weight, or pedestrian machines such as push lawnmowers which simply require squeezing a bail or handle(s) against the handlebar with one or two hands. Neither example significantly complicates the operator's efforts to control the machine.

The operator station of a stump cutter is determined by the location of the three hydraulic control levers described above—with the operator standing on the ground. In this position, the operator is located in an area where the risk of being struck by a thrown object is minimized. During operation, the entire machine is advanced into the stump thus requiring the operator to alter his/her standing position to remain comfortably in front of the controls. Job site conditions can also affect how the operator is positioned at the control area. In addition, to avoid fatigue while standing for potentially long periods of time, it is important that the operator be able to comfortably reposition his/her feet and stance.

Sensing the operator's presence at the control levers of a stump cutter is further complicated by the intermittent, and sometimes simultaneous, use of the three control levers. Additionally, operators routinely use gloves for protection from the weather or as protection for an operator's hands. The combined effect results in a situation where the option of utilizing levers with mechanical or electromechanical interlocks is not practical. These devices would require an operator to depress a button or switch while gripping the lever each time the operator moved from one control lever to another. Such a system also provides little freedom in repositioning the operator's hands on the levers. Accordingly, such a system would cause fatigue, result in frequent unwanted cutter wheel stoppages, hinder operation, and create control errors. Freedom of hand/finger position on the control levers is also very important to avoid hand fatigue. Such difficulties are likely to cause operator rejection and provide motivation for circumventing the system.

Therefore, there is a need in the art for an OPS for a stump cutter device that will not inhibit the operator's control of the stump cutter, will provide reliable operation, and can appropriately sense the operator's presence at the control levers without creating fatigue and operator discomfort. The present invention overcomes the shortcomings of the prior art, and addresses these needs.

SUMMARY OF THE INVENTION

The preferred stump cutter controller and operator presence system constructed in accordance with the principles of the present invention includes one or more capacitive sensors in each of the three control levers that control movement of the cutter wheel, a sensor circuit for measuring changes in the capacitance of the sensors, a guard electrode in each of the three control levers for isolating the capacitive sensors, a clutch/brake assembly that is energized electrically to engage a clutch, and when not energized, a brake is spring applied to stop rotation of the cutter wheel, and a controller. In addition, the following devices may also be preferably included: an engine and/or cutter wheel speed sensor, a cutter wheel clutch control switch, lever guards to minimize the probability of vegetation coming in contact with the control levers, a cutter wheel engaged indicator light, and an OPS sensor activated light. While the device is particularly useful for determining operator presence in connection with a stump cutter, the principles could be applied to other cutting, grinding, and chipping equipment, with a stump cutter being one example only.

The system is designed to automatically disengage drive and apply a brake to the cutter wheel of a stump cutter based on the controller sensing that an operator has left the operating station—which is assumed when the operator has not touched any one of the three control levers of the operator station for a predetermined period of time. Cutter wheel engagement will occur with a control that is similar to machines without an OPS system. More specifically, a cutter wheel clutch engagement control switch is located at the operator station, with engagement being independent of the OPS sensors in the control levers. Once the clutch is engaged, however, the OPS system (including the sensors in the control levers) is then capable of automatically disengaging the clutch. When the clutch is disengaged, a brake that is preferably an integral part of the clutch assembly is simultaneously applied to stop the cutter wheel.

The OPS sensors in the control handles are designed to maximize sensitivity, as required for reliable operation when operators wear gloves, while minimizing false detection of an operator as could occur when the control handles are subjected to rain and/or muddy conditions.

One feature of the present invention is that the controller logic can be set to allow the clutch to remain engaged during a delay period, of predetermined duration, to permit the operator to move a hand off of one control lever to another control lever. The preferred range for the predetermined delay is from 0.5 seconds to several seconds, and is preferably set at about 0.5 seconds. Other delay periods may be utilized as appropriate.

Another feature of the present invention is that the controller logic can be set to provide a grace period, of varying duration, that allows the clutch to reengage. Preferably the disengagement occurs after the delay period expires, or after an operator has been absent from the control(s) for more than the delay period which is preferably about 0.5 seconds. At the time the clutch is disengaged, the cutter wheel will begin to stop. The time required for the cutter wheel to stop depends on the speed of the cutter wheel, its inertia, and the braking system. The duration of the grace period will thus vary, based on the speed of the cutter wheel which may be measured directly by the speed of the cutter wheel and/or inferred by measuring the speed of the engine. Accordingly, if an operator activates any of the sensors after the disengagement occurs and before the grace period has ended, then the clutch will automatically reengage.

Another feature of the present invention is that each handle includes a capacitive sensor located in the upper portion of the handle (i.e., in an area of the handle that the operator will touch while operating the stump grinder). A guard electrode is located in an area that the operator will not generally touch. A detection circuit is connected to the sensor and electrode for measuring whether the capacitance of the capacitive sensor has changed. In the preferred embodiment, the sensor is used to determine if the operator is touching the handle, while the guard electrode is used to avoid false detections and/or provide the ability to detect operator presence. The output from the detection circuit is provided to a mechanical or electrical controller for the stump cutter, which controller inhibits operation of the stump cutter wheel if operator presence is undetected.

In the present application, the presence of an operator is described as being determined by sensing if the operator is touching the handles. As used herein, the term "touching" and/or "contact" is intended to describe contact between the handle and a bare hand, a gloved hand, and/or some other part of the operator body (uncovered or clothed). Accordingly, the terms touching and contacting are meant to include direct contact of the handle by the operator, as well as indirect contact of the handle through gloves, clothes, and other work related coverings.

Therefore, according to one aspect of the invention, there is provided a controller system for a stump cutter having three operator control handles, comprising: a capacitive sensor mounted in each handle, the capacitive sensors arranged and configured to change capacitance when the respective handle is touched by an operator; an operator presence circuit connected to the capacitive sensors, the circuit having a node where changes in capacitance of the capacitive sensors can be measured as a change in voltage; and a controller connected to the operator presence circuit, the controller receiving the changes in voltage from the operator presence circuit, and wherein the controller initiates a predetermined delay period when the voltage change indicates that the handles are no longer being touched by the operator.

According to another aspect of the invention, there is provided the controller system of the preceding paragraph further comprising a clutch relay, and wherein the controller is arranged and configured to deenergize the clutch relay at the end of the delay period. Further, wherein the controller is arranged and configured to reenergize the clutch relay during a grace period if the operator touches one of the handles during the grace period. Still further, a speed sensor may be operatively connected to an engine driving the stump cutter, the speed sensor measuring the speed of the engine and the output of the speed sensor being provided to the controller, wherein the grace period varies based on measured speed of the engine at the end of the delay period.

According to still another aspect of the invention, there is provided a controller system for a cutting device having a plurality of operator control handles, comprising: a capacitive sensor mounted in each of the plurality of handles, the capacitive sensor arranged and configured to change capacitance when the respective handle is touched by an operator; a plurality of capacitance determining circuits, each of the capacitance determining circuits connected to a respective one of the capacitance sensors; a controller connected to the capacitance determining circuits, the controller receiving determined capacitances, and wherein the controller initiates a predetermined delay period when the determined capacitances indicate that the handles are no longer being touched by the operator.

According to still another aspect of the invention, there is provided, a method of stopping a moving element based on the presence of an operator controlling three operator control handles, comprising: mounting a capacitive sensor in each of the control handles, each of the capacitive sensors arranged and configured to change capacitance when the respective handle is touched by an operator; connecting an operator presence circuit to the capacitive sensors, the circuit having a node where changes in capacitance of the capacitive sensors can be measured as a change in voltage; monitoring the changes in voltage with a controller connected to the operator presence circuit, the controller receiving the changes in voltage from the operator presence circuit; and initiating a predetermined delay period prior to stopping the moving element when the voltage change indicates that the handles are no longer being touched by the operator.

While the invention will be described with respect to preferred embodiment configurations and with respect to particular devices used therein, it will be understood that the invention is not to be construed as limited in any manner by either such configuration or components described herein. While the example of a stump cutter type device is provided herein, the principles of this invention extend to any environment in which operator presence and/or detection is desired. These and other variations of the invention will become apparent to those skilled in the art upon a more detailed description of the invention.

The advantages and features which characterize the invention are pointed out with particularity in the claims annexed hereto and forming a part hereof. For a better understanding of the invention, however, reference should be had to the drawings which form a part hereof and to the accompanying descriptive matter, in which there is illustrated and described a preferred embodiment of the invention.

BRIEF DESCRIPTION OF THE DRAWINGS

Referring to the drawings, wherein like numerals represent like parts throughout the several views.

DETAILED DESCRIPTION OF THE PREFERRED EMBODIMENT

Figure 1:
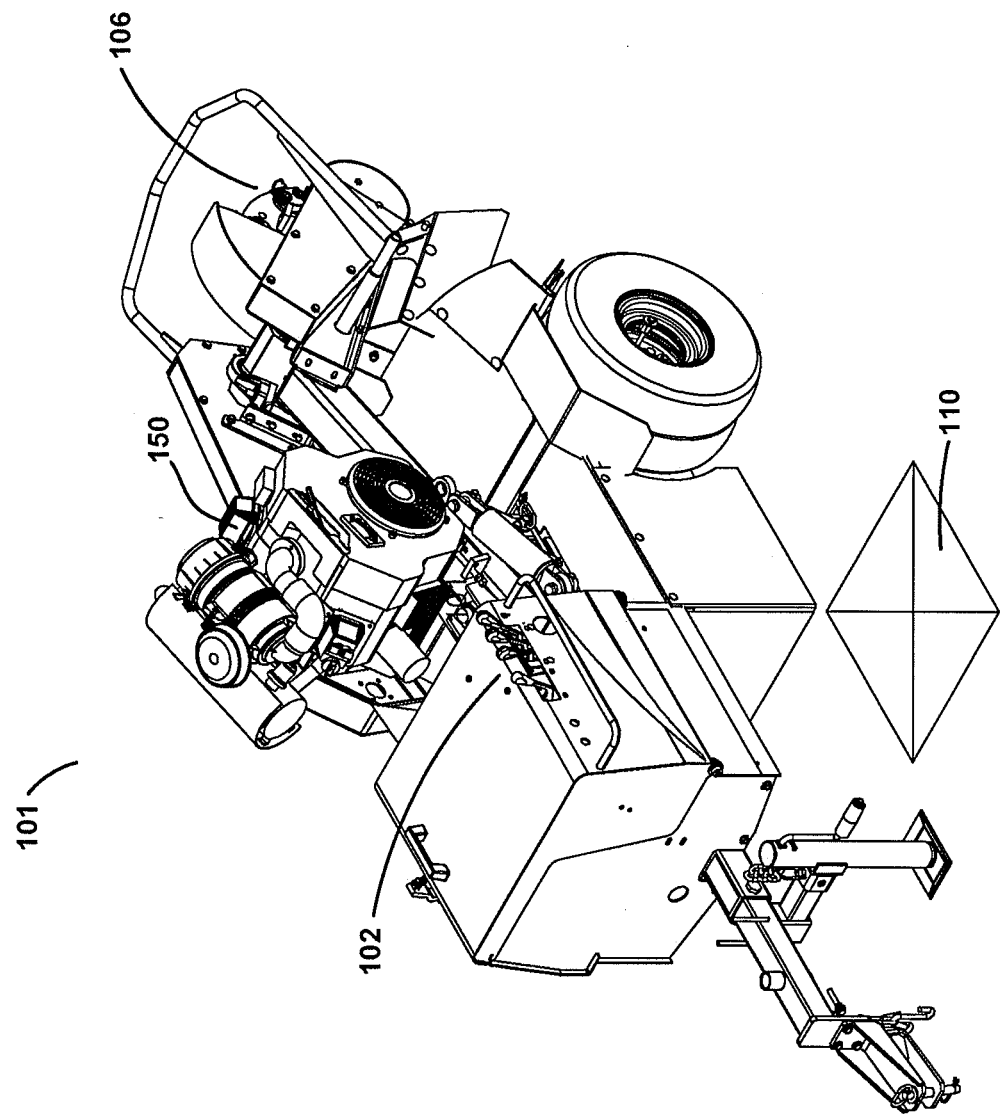
FIG. 1 is an isometric view of a stump cutter machine indicating the location of the operator station, the area where the operator stands and the cutter wheel.
Figure 2:
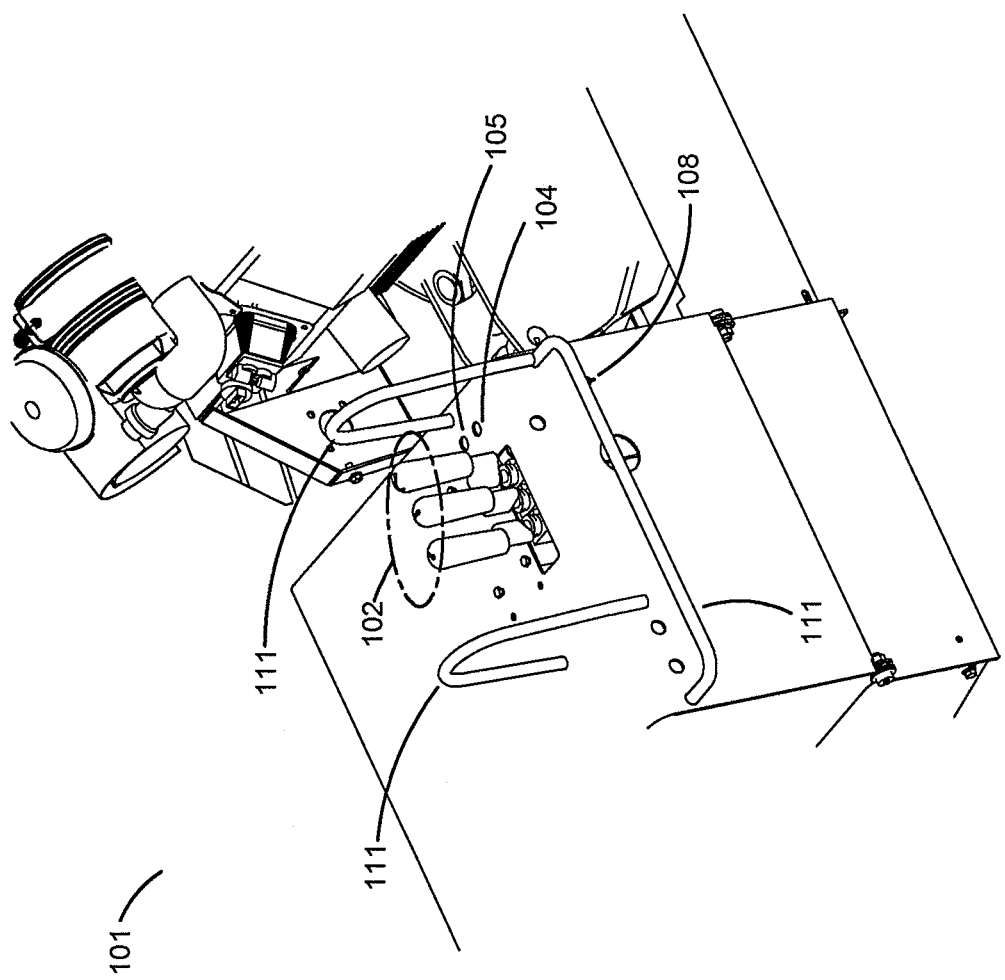
FIG. 2 is a close-up isometric view of the operator station 102 area.

The principles of the present invention apply particularly well to its application in a stump cutter device environment. However, other environments in which operator presence and/or detection is desired may also employ the principles of this invention. For example, the present invention may be employed in tree, grass, brush and stump devices that cut, chip and/or grind.

With reference to FIGS. 1-5, this invention applies capacitive sensing technology to a stump grinder 101 (best seen in FIGS. 1 and 2), or other machine where operator presence may be useful or required, in order to sense when the operator is not present at the control station 102. If this condition is sensed, a controller 60 (best seen in FIGS. 3 and 5) issues a signal to stop the grinding disk 106 (comprising a cutter wheel—or other powered device in alternative equipment). In the preferred embodiment, after the controller 60 determines that the operator is not present at the control station 102, it then waits a predetermined period of time to see if the operator returns to the control station 102 before issuing the signal to stop the grinding disk 106. This allows an operator to move his hands between the handles 21, 50, 51 (e.g., to operate the equipment in its intended manner). After the predetermined period of time and the stop signal has been issued, preferably a grace period begins. If the operator returns to the control station 102 before the grace period expires, then the controller 60 allows resumed operation of the stump cutter 101.

A preferred embodiment constructed in accordance with the present invention includes several components. First, capacitance sensors are incorporated into the control handles 21, 50, 51 located at the operator station 102. The area designated 110 illustrates that area in which the operator would normally stand while attending to the controls located at the operator station 102. Second, a sensing circuit 31 (best seen in FIG. 4) is used to generate a signal and measure changes in capacitance of the control handles 21, 50, 51. The measurement output 30 of the sensing circuit 31 is provided to the controller 60. In the preferred embodiment, the sensing circuit 31 may reside on the same circuit board as the controller 60, and so the signals from the handles may be provided over appropriate wiring or cables through a connector block (not shown) to the sensing circuit 31 and then provided to the controller 60. The sensing circuit 31 may alternatively be provided on a separate board with the outputs provided to the controller 60 board (or module). The controller 60 also has inputs for the grinding disk engage switch 65 and an engine rpm sensor 67, as well as outputs for the grinding disk engage 62 relay or solenoid, the LED operator presence indicator 115, and the LED clutch engage indicator 114. The controller 60 preferably includes both hardware and software arranged and configured to control the operation of the machine based on the inputs. It will be appreciated, however, that other additional diagnostic display capability may be provided.

In the preferred embodiment, the controller 60 contains a commercially available capacitance measurement circuit MC33794 manufactured by Freescale Semiconductor, of Austin, Tex. and a commercially available programmable microcontroller MC9S12D64 manufactured by Freescale Semiconductor of Austin, Tex. The software steps for implementing operator presence functions are preferably programmed into the on-board MC9S12D64 FLASH memory. However, it will be appreciated that other controllers may be utilized, including those of the type with ladder logic programming, general purpose controllers, special purpose controllers, and other CPU based computers and controllers. While not shown in detail in the figures, the controller is connected to appropriate attendant peripheral and supporting devices/chips to operate in its intended manner.

Since the controller 60 needs electrical input from the grinding disk 106 clutch engage switch 65 (shown as the actual switch in FIG. 2 by the number designation 108), it is desirable that the clutch 61 be an electrical PTO type clutch/brake. This type of device engages the clutch 61 when energized with an electrical actuator and allows a spring to engage a brake 70 when not energized. Thus, the clutch 61 is electrically engaged/spring disengaged, while the brake 70 is electrically disengaged/spring engaged. An example of a commercially available electrical PTO clutch/brake of the type described is manufactured by Ogura Industrial Corporation.

As noted above, in the preferred embodiment there are three hydraulic control handles 21, 50, and 51 each having one or more capacitive sensors incorporated therein. Each of the sensors may have an equal or differing predetermined fixed delay period to allow an operator to move between the sensors. Further, equal or differing grace periods may be employed for each of the sensors (e.g., depending on the last sensor touched by the operator) for the clutch 61 to reengage if an operator contacts a sensor before the grace period expires. This grace period may also be of variable duration (i.e., longer when the grinding disk 106 speed is high, and shorter when the grinding disk 106 speed is low).

Control Handle Sensors

Figure 4:
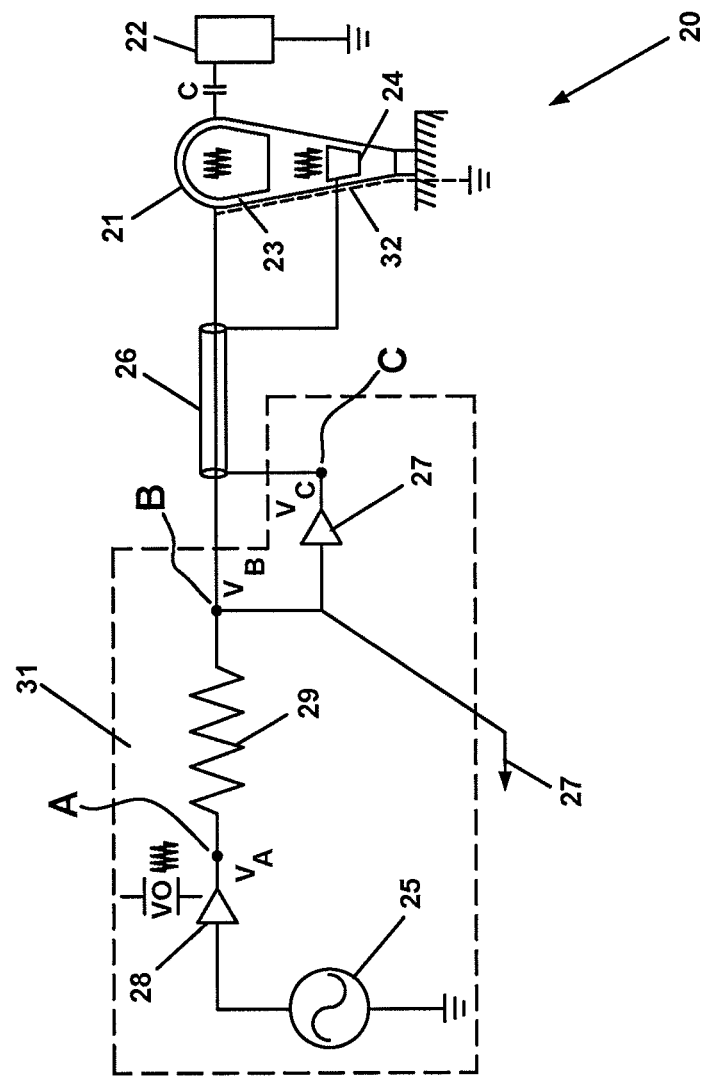
FIG. 4 is a schematic representation of a control lever for a stump cutter including ring capacitor and electrode and the detection circuit employed therewith.

Turning now to the handles of the operator detector/presence system of the present invention, reference will be had to FIG. 4. The system is shown generally at 20 and is comprised of capacitive sensor 23 and guard electrode 24, as well as connecting cable 26 and detection circuit 31. The sensor 23 and electrode 24 are located within handle 21.

Figure 3:
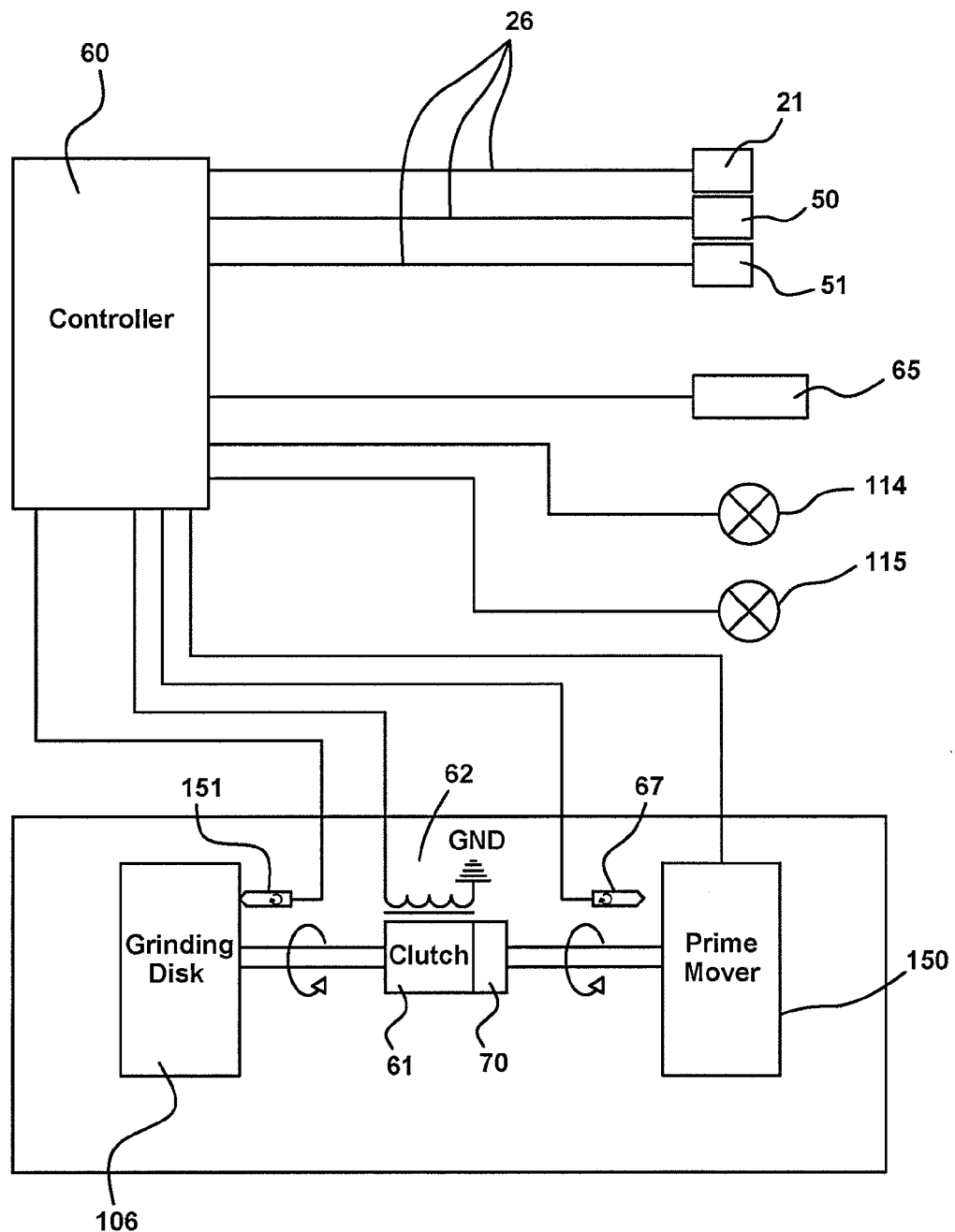
FIG. 3 is a schematic representation of the control system including the handles.

In the preferred embodiment stump cutter, there are three hydraulic control handles 21, 50, and 51 (best seen in FIG. 3). For clarity, however, only one handle is illustrated in FIG. 4. Preferably, the second and third handles 50, 51 are constructed in an identical fashion as the first handle 21. Further, the detection circuits associated with the second and third handles 50, 51 may be equivalent to detection circuit 31 (described below).

In the case of other embodiments used in connection with other types of equipment, it may be possible to utilize a single handle 21 as described herein—either alone or in combination with other operator presence or detection devices. Accordingly, the invention is not limited to use of a plurality of identical handles in connection with a single machine.

Still referring to FIG. 4, the capacitive sensor 23 is preferably a discrete ring physically located in the hydraulic valve control lever handle 21. In operation, the sensor is able to detect changes in capacitance when a hand or other object touches the handle 21. A hand touching the handle 21 is schematically shown as a functional block at the designation 22. The hand 22 forms a capacitor C (i.e., the capacitive sensor acts as a first plate of the capacitor, with the hand to ground forming the other plate). The detection circuit 31 senses the change in capacitance caused by human touch. The measurement output 30 of the detection circuit 31 is provided to the logic of controller unit 60. As noted above, the controller unit 60 preferably utilizes the handles 21, 50, 51 as part of a greater control system. More specifically, the sensing system is based on a change in capacitance that is observed by the circuit 31 when a human hand 22 is very close to or touching the handle 21.

By using the guard electrode 24, the operator presence system becomes less sensitive to the effects of rain or other conductive liquid including humid air or moisture on the handle 21. Detection circuit 31 includes a low radio frequency sine wave generator 25. The amplitude and phase of the sinusoidal wave at the capacitive sensor 23 is affected by objects 22 touching or contacting the upper portion of the handle 21 (e.g., when said objects form a capacitor C). The amplitude and phase of the voltage at point $V_B$ is also provided via power amplifier 27 to point $V_C$. This causes the voltage at the guard electrode 24 to be at the same voltage as the capacitive sensor 23. By lifting the voltage on a lower point of the handle above ground, the effects of water on the handle 21 are eliminated. Accordingly, water present or flowing on the handle 21 does not ground the capacitive sensor 23 and/or act to form a capacitor.

The voltage measured ($V_B$) at node B is the output measurement 30. It is an inverse function of the capacitance between the capacitive sensor 23 being measured and the other objects within the electric field acting as plates. In the preferred embodiment, an IC chip manufactured by Freescale Semiconductor, Inc. of Austin, Tex., is used to measure the capacitance. The chip includes a series resistor 29 chosen such that a linear relationship between voltage and capacitance exists for capacitance values of 10 pF to 70 pF.

Design of the capacitive sensor 23 within the handle 21 includes consideration of the following capacitor properties:

Capacitance is proportional to the area of the "plates". This corresponds to contact area on the handle 21.

Capacitance is proportional to the dielectric constant of the material separating the "plates". Capacitance is therefore dependent on ambient air properties such as humidity.

Capacitance is inversely proportional to the distance between the "plates". This property affects sensitivity settings especially based on the thickness of any overmolding on the handle 21.

The following Table 1 illustrates approximate measured voltages and capacitances of the embodiment of FIG. 4.

TABLE 1

|  | $V_A$ | $V_B$ | C |
| --- | --- | --- | --- |
| No Hand | $V_0$ | $V_0$ | ~10-20 pF = $C_0$ |
| Hand (22) | $V_0$ | $V_1 <$ $V_0$ | ~25-50 pF (gloved) ~50-70 pF (bare) |
| Water, One sensor | $V_0$ | $V_2 \neq$ $V_1$ | ~30-40 pF |
| Water, Both sensors | $V_0$ | $\approx V_0$ | ~$C_0$ + 1 pF |

If water, likely due to rain, is present on a handle having a single ring, then the liquid forms a second electrode of the capacitor causing the capacitance to change—similar to a gloved hand touching the handle. The present two-ring system, however, effectively breaks this conductive path through the fluid and isolates the capacitive sensor from the ground. Also, for the present system to operate in its intended manner, it is preferably that the capacitance change caused by water is smaller than the capacitance change caused by a hand.

The upper or capacitive sensor 23 is positioned on the upper portion and on top of the handle 21 to allow for operator hand placement preferences. This sensor 23 is separated from the lower or guard electrode 24. The guard electrode 24 is located at the base of the handle 21 where an operator will not generally touch it. Since the sensor 23 and electrode 24 have equal voltage magnitudes and are in-phase, a capacitor formed by conductive liquid between the two would not carry any current and they would remain separate. Fluid could cause increased capacitance between the guard electrode 24 to ground, however, the power amplifier 27 isolates point C from point B ($V_B=V_C$) since it has a high input impedance/low output impedance. Therefore, the measurement taken by the controller 60 would use the voltage from the capacitive sensor 23 ($V_B$) which is the electrode or sensor of concern in detecting operator presence. The guard electrode 24 helps establish whether the change in capacitance of the first electrode is due to an operator or fluid on the handle.

Referring again to Table 1, it may be noted that the sensitivity can be set to a cutoff of 50 pF such that the capacitance due to flowing water would not be understood as operator presence. However, this may limit the operator to using bare hands. In practice it may be desirable to be able to detect an operator wearing gloves (even as thick as winter gloves). Further, operators may desire to only lightly touch the top of the handle to indicate their presence rather than to grip the handle fully. The corresponding relatively small contact area inherent to this practice may produce a capacitance of only 45 pF with bare hands in which case the system would not recognize operator presence. Since the capacitance due to water so closely approximates that of a human presence, it is desirable to use the present system to eliminate sensitivity to such effects.

Calibration on power-up of the controller 60 allows the system to establish a baseline capacitance based on environmental conditions. This allows the capacitance effects of elements such as rain and humidity to be discounted for the duration of machine operation. The capacitance seen by the system on power-up becomes the baseline and an increase in capacitance due to a user contacting the handles is required to trip the sensor system. The controller 60 remembers the baseline capacitance determined at power-up and subtracts that value from values seen during operation before applying sensitivity parameters. For example, if the controller 60 records a capacitance of 10 pF on power-up and later observes a capacitance of 50 pF, then the system will act as if no operator is present if the sensitivity cutoff point is set at 45 pF, but will act as if an operator is present if the sensitivity cutoff point is set at 35 pF.

In the preferred embodiment, if an operator's hand 22 is touching the handle 21 at power-up of the controller 60, then the baseline for that handle is out of range. In this case, that handle is ignored and operator presence is determined with the other handles. In this manner, the present system 20 is able to avoid false detections and to detect operator presence when the initial calibration would otherwise place the result out of range.

The baseline capacitance may include the capacitance created by any grounded objects in reasonable proximity—including the ground itself—as well as the wiring 26. The sensitivity cutoff point can be pre-selected and programmed into a controller unit based on testing related to the specific application for the handle(s).

The present invention preferably includes a handle 21, 50, 51 design which completely and permanently encloses the capacitive sensor 23 and guard electrode 24 within a molding. The necessary wiring 26 preferably exits the bottom of the handle 21 and is sent to the controller 60 via a plug which allows for simplicity of replacement if a handle is damaged. Ideally, the handle wires 26 are completely shielded from the possibility of being damaged along their length.

FIG. 3 illustrates the three handles 21, 50, and 51 (each having the internal sensor and electrode described above) connected to controller 60. Other various inputs and outputs for the stump cutter are connected to controller 60 as well. The outputs include connections to the clutch relay 62, clutch light 114, and clutch switch 65. As noted above, when an operator is no longer sensed, the controller de-energizes the clutch relay 62. This in turn opens the clutch 61 so that the grinding disk 106 is not turned by the motor 150, where the motor 150 may be a gas or diesel engine. Additionally, a brake 70 may be engaged to stop the grinding disk 106. Clutch light 114 may provide visual indication to an operator on the status of the clutch 61. Those skilled in the art will appreciate that additional diagnostic display capability may also be provided. The speed of the grinding disk 106 may be determined by a grinding disk pickup 151 or may be inferred by an engine pickup 67.

As described above, the motor 150 may drive the grinding disk 106 directly via a clutch 61. Alternatively, a hydrostatic system may be employed wherein the engine 150 drives a hydraulic pump (not shown) which in turn drives a hydraulic motor in order to drive the grinding disk 106. The grinding disk 106 may be connected to the hydraulic motor via a chain, shaft, or other suitable drive member. In such instance, the clutch 61 is operatively connected to the output of the hydraulic motor (or the input to the grinding disk 106) in a suitable manner in order to disconnect the input power.

Figure 6:
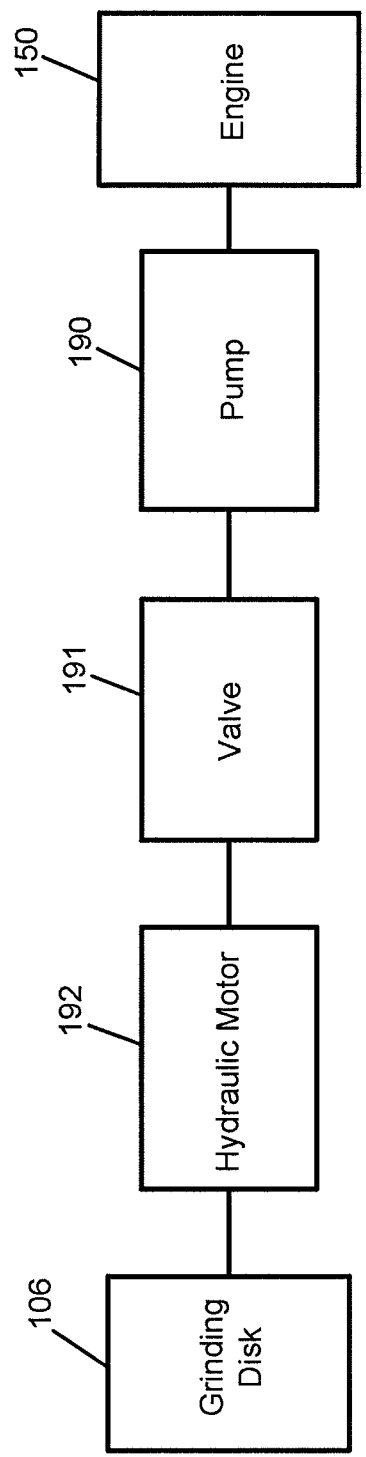
FIG. 6 illustrates an alternative embodiment of driving the grinding disk 106 hydraulically.

An alternative embodiment of the method of driving the grinding disk 106 is shown in FIG. 6. In this embodiment, the engine 150 drives a hydraulic pump 190. A hydraulic motor 192 is thereby driven hydraulically, with the speed of the motor 192 controlled by a variable control valve 191 connected to the controller 60. More specifically, the pump 190 provides the fluid flow, the motor 192 converts the fluid flow to mechanical energy to rotate the grinding disk 106 and the control valve 191 controls the on/off cycle of the hydraulic motor 192. In this embodiment, the hydraulic system reduces hydraulic fluid flow to the hydraulic motor 192 to stop the grinding disk 106. When the flow of hydraulic oil is reduced or stopped, the result is that the grinding disk 106 stops quickly. Accordingly, this embodiment is a clutchless and brakeless design.

Figure 5:
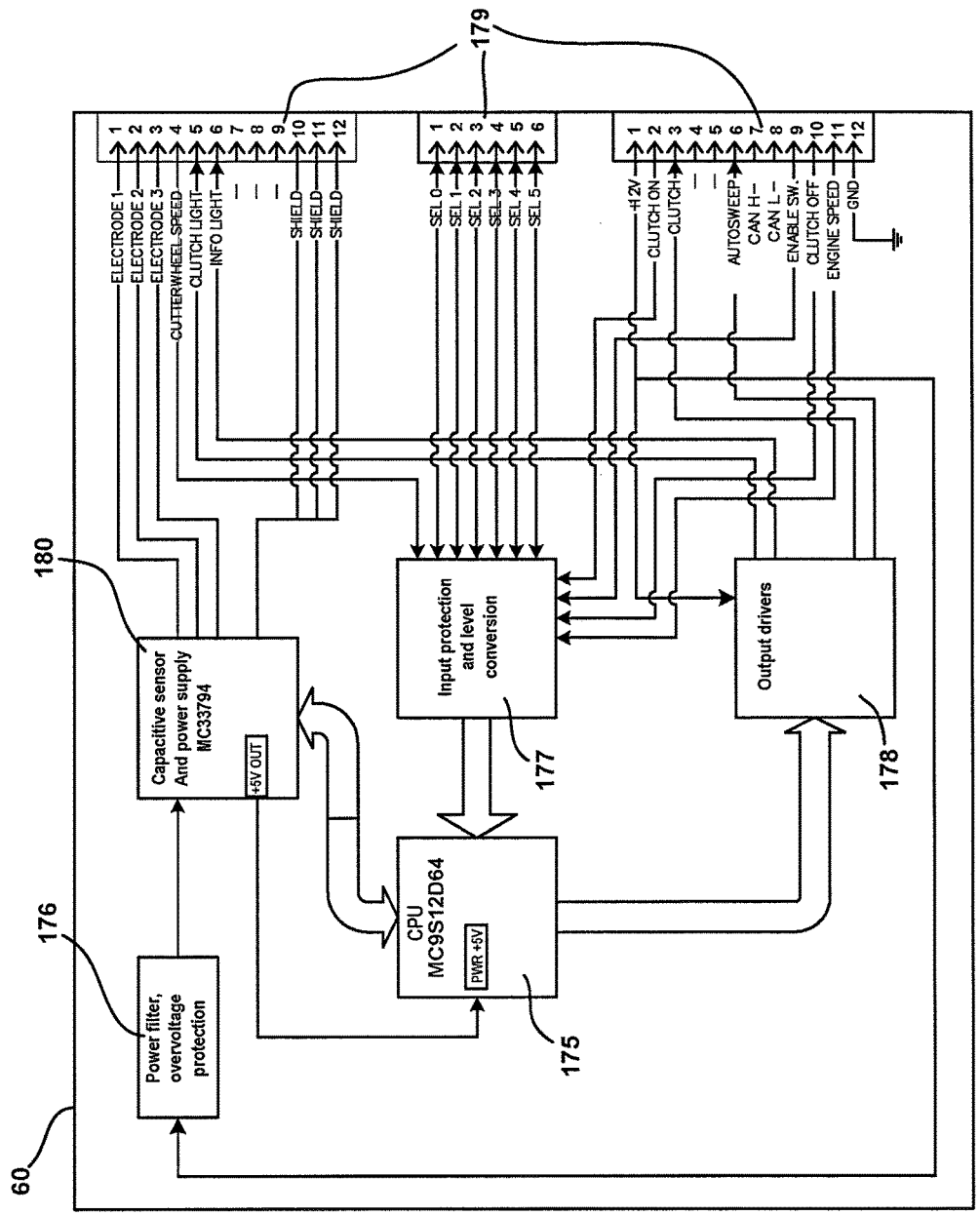
FIG. 5 is a schematic diagram of the functional blocks of the controller 60.

FIG. 5 schematically illustrates the functional components that comprise the preferred controller 60. Block 176 provides power filtering and overvoltage protection to the various components. Block 175 provides the central processor and on-board memory to store programming steps. Block 177 provides input protection and conversion for the various inputs. Block 178 provides output drivers for the various outputs. Blocks 179 illustrate the various input and output connections of the controller 60. Block 180 includes the preferred capacitive sensor circuit 31 and power supply.

In constructing the handles, 21, 50, 51, an overcoating covers handle 21 to protect it from the environment. A supporting or load-bearing shaft is provided to connect the respective handle to the machine. A plastic, non-conductive element is mounted on the shaft and holds the sensor 23 and electrode 24 in place. The wiring 26 providing electrical transmission from the sine wave generator 25 includes a sensor signal flow path 101 and a guard signal flow path 102. The sensor signal flow path 101 is operatively connected to the plate of the sensor 23. The guard signal flow path 102 is operatively connected to the guard electrode 24.

In Operation

In operation, a preferred embodiment controller 60 is programmed to operate as described in this section. It will be appreciated, however, that other manners of operation are possible as described above and as set forth in the appended claims. Accordingly, the preferred operation described in this section is by way of example, and not by way of limitation.

First, an operator engages the clutch 61 using the physical grinding disk drive control switch 108. The functional switch is electrically shown as 65 in FIG. 3. When the switch is engaged, a start-up grace period is initiated. The start-up grace period is for a predetermined duration, for example approximately 2 seconds. The clutch engaged LED 114 indicator preferably blinks during all grace periods to provide a visual indication to the operator of the status. If at any time the operator moves the grinding disk drive control switch 108 to the disengaged position, when the clutch 61 is engaged, the clutch will be disengaged and the brake 70 applied.

Second, at controller power-up, the controller 60 performs a self test of the handles 21, 50, and 51. Measurements are taken with the shield wire and without the shield wire. In the event that a handle fails a test, then preferably that handle is ignored when determining operator presence. In this case, an appropriate visual indication may be illuminated for the operator.

Third, the controller 60 checks the operation of clutch LED 114. For example, the controller 60 checks that the clutch LED 114 is not an open circuit or a short circuit. This test is performed to make sure that the operator is being advised of the correct machine status. If the circuit is open or shorted, then the clutch 61 is not engaged (e.g., the clutch relay 62 is not energized). If the circuit is closed, then the clutch is allowed to be energized. This test is repeated throughout operation with the same steps followed.

Fourth, if operator presence is sensed before the start-up grace period expires, then the clutch 61 remains energized and the clutch engaged LED indicator 114 is illuminated in a steady manner. The operator knows the operator presence status by referring to the LED indicator 115 which is illuminated if operator presence is sensed by the controller 60. The operator need only activate a capacitive sensor 23 by touching any of the control levers 21, 50, 51.

Fifth, during cutting operations, if the controller 60 does not sense operator presence at any time, then the controller 60 first enters a short predetermined delay period (such as one-half second), in which the machine continues to operate as if the operator was present. If the controller 60 still does not sense operator presence prior to the end of the delay period, then the machine enters a grace period of variable duration at which time, the clutch is de-energized and the brake 70 is applied. If operator presence is sensed by the controller 60 before the grace period expires, the clutch is re-energized and the clutch engaged LED 114 returns to steady illuminated. If operator presence is not sensed by the controller 60 before the grace period expires, the clutch engaged LED 114 turns off and the brake 70 is spring-applied. The grinding disk 106 will not rotate again until the grinding disk control switch 108 is used to re-engage the grinding disk 106 as previously described.

Preferably the length of the grace period is adjustable within the controller software to allow for high or low rpm operations. A speed sensor 67 informs the controller 60 of the engine speed from which grinding disk speed is inferred. It is also possible to directly measure the actual speed of the grinding disk. For high rpm operation, a longer grace period is allowed as the disk 106 will take longer to slow to a stop from high speeds. For low rpm operation, a shorter grace period is allowed as the disk 106 will stop relatively quickly from slower speeds. This function is to ensure that if an operator recovers operation during the grace period by touching the handles 21, 50, 51, the grinding disk 106 will not have already stopped. The duration will depend on the inertia of the grinding disk 106 and brake characteristics. In the preferred example illustrated in the figures, the grace period at high engine rpm is approximately two seconds, and at low engine rpm is approximately one-half second.

Lever Guards

Lever guards 111 may also be provided on the stump cutter 101. The guards 111 (best seen in FIG. 2) are comprised of bars located in the vicinity of the control handles 21, 50, 51 (and so generally in or proximate the operator station area 102) to limit the possibility of foreign objects, such as branches or leaves from vegetation contacting the handles 21, 50, 51.

It should be understood that even though numerous characteristics and advantages of the present invention have been set forth in the foregoing description, together with details of the structure and function of the invention, the disclosure is illustrative only and changes may be made in detail, especially in matters of the supporting hardware, components and devices, and to the full extent indicated by the broad general meaning of the terms in which the appended claims are expressed.

We claim:

1. A controller system for a stump cutter having three operator control handles, comprising:
    (a) a capacitive sensor mounted in each of first, second and third operator control handles, each operator control handle being configured for selectively controlling movement of a stump cutter in respective first, second and third directions in response to movement of the respective handle by an operator, each of the capacitive sensors arranged and configured to change capacitance when the respective operator control handle is touched by the operator;
    (b) an operator presence circuit connected to each of the capacitive sensors, the circuit having a node where changes in capacitance of the capacitive sensors can be measured as a change in voltage; and
    (c) a controller connected to the operator presence circuit, the controller receiving the changes in voltage from the operator presence circuit and in response to the received voltage change indicating that each of the three operator control handles is no longer being touched by the operator, the controller including a computer with a memory storing software instructions that configure the controller to initiate a predetermined delay period only when the voltage change indicates that each of the three operator control handles is no longer being touched by the operator, during which predetermined delay period the stump cutter is configured to operate as if the operator were touching at least one of the three operator control handles;
    wherein the controller is configured to issue a signal to stop the stump cutter following the delay period if the voltage change indicates that each of the three operator control handles is no longer being touched by the operator during the delay period; and
    wherein the controller is configured to initiate a grace period following the delay period, and if the voltage change indicates that at least one of the three operator control handles is touched by the operator during the grace period, the controller is configured to resume operation of the stump cutter.

2. The controller system of claim 1, further comprising a clutch relay, wherein the predetermined delay period has a beginning and an end, the beginning occurring when the changes in voltage from the operator presence circuit indicate that each of the three operator control handles is no longer being touched by the operator, the end occurring a predetermined time period after the beginning, and wherein the controller is arranged and configured to deenergize the clutch relay at the end of the delay period.

3. The controller system of claim 2, wherein the controller is arranged and configured to reenergize the clutch relay during the grace period immediately following the delay period if the operator touches one of the handles during the grace period.

4. The controller system of claim 3, further comprising a speed sensor operatively connected to an engine driving the stump cutter, the speed sensor measuring a speed of the engine and providing an output to the controller.

5. The controller system of claim 4, wherein the controller is configured to determine a length of the grace period in response to the measured speed of the engine, such that the grace period varies based on measured speed of the engine at the end of the delay period.

6. The controller system of claim 5, wherein the controller is configured to decrease the length of the grace period as the speed of the engine decreases.

7. The controller system of claim 1, further comprising a variable hydraulic valve, and wherein the controller is arranged and configured to at least partially close the hydraulic valve in order to limit a flow of hydraulic fluid at the end of the delay period.

8. The controller system of claim 7, wherein the controller is arranged and configured to return the hydraulic valve to its original position during a grace period following the delay period if the operator touches one of the handles during the grace period.

9. The controller system of claim 1, wherein the predetermined delay period has a beginning and an end, the beginning occurring when the changes in voltage from the operator presence circuit indicate that each of the three operator control handles is no longer being touched by the operator, the end occurring a predetermined time period after the beginning, wherein the controller is configured to determine the grace period having a length dependent on a speed of the stump cutter during the delay period and initiate the grace period immediately after the end of the delay period.

10. The controller system of claim 1, wherein the first direction includes moving a cutter wheel of the stump cutter parallel to a ground surface about an axis of rotation; the second direction includes movement of the stump cutter parallel to the ground surface forwards and backwards; and the third direction includes raising and lowering the cutter wheel perpendicular to the axis of rotation.

11. The controller system of claim 3, wherein the controller is arranged and configured to require a restart of the stump cutter if the voltage change does not indicate that at least one of the three operator control handles is touched by the operator during the grace period.

12. A controller system for a stump cutter having a plurality of operator control handles, comprising:
   (a) a stump cutter having three operator control handles, each operator control handle being configured for selectively controlling movement of the stump cutter in respective first, second and third directions in response to movement of the respective handle by an operator;
   (b) a capacitive sensor mounted in each of the three operator control handles, each of the capacitive sensors arranged and configured to change capacitance when the respective operator control handle is touched by an operator;
   (c) a plurality of capacitance determining circuits, each of the capacitance determining circuits connected to a respective one of the capacitance sensors;
   (d) a controller connected to the capacitance determining circuits, the controller receiving determined capacitances and in response to the received determined capacitances indicating that each of the three operator control handles is no longer being touched by the operator, the controller including a computer with a memory storing software instructions that configure the controller to initiate a predetermined delay period only when the determined capacitances indicate that each of the three operator control handles is no longer being touched by the operator with the delay period during which predetermined delay period the stump cutter is configured to operate as if the operator were touching at least one of the three operator control handles;
   (e) a clutch relay, wherein the predetermined delay period has a beginning and an end, the beginning occurring when changes in voltage from the operator presence circuit indicate that each of the three operator control handles is no longer being touched by the operator, the end occurring a predetermined time period after the beginning, and wherein the controller is arranged and configured to deenergize the clutch relay at the end of the delay period, and wherein the controller is arranged and configured to reenergize the clutch relay immediately following a grace period if the operator touches one of the handles during the grace period; and
   (f) a speed sensor operatively connected to an engine driving the stump cutter, the speed sensor measuring a speed of the engine and providing an output of the speed sensor provided to the controller, wherein the controller is configured to determine a length of the grace period in response to the measured speed of the engine, such that the grace period varies based on measured speed of the engine at the end of the delay period.

13. The controller system of claim 12, wherein the controller is configured to decrease the length of the grace period as the engine speed decreases.

14. A controller system for a stump cutter having an operator control station, the controller system comprising:
   a capacitive sensor configured to change capacitance in response to a presence of an operator at the control station;
   an operator presence circuit connected to the capacitive sensor, the circuit having a node where changes in capacitance of the capacitive sensor are measured as a change in voltage; and
   a controller connected to the operator presence circuit, the controller receiving the changes in voltage from the operator presence circuit and in response to the voltage change indicating that the operator is not present at the control station, the controller including a computer with a memory storing software instructions that configure the controller to initiate a predetermined delay period only when the voltage change indicates that the operator is not present at the control station, during which predetermined delay period the stump cutter is configured to operate as if the operator were present at the control station;
   wherein if the voltage change does not indicate that the operator is present at the control station during the delay period, the controller is further configured to issue a signal to stop the stump cutter and initiate a grace period immediately following the delay period, and if the voltage change indicates that the operator is in the presence of the control station during the grace period, the controller is configured to resume operation of the stump cutter.

15. The controller system of claim 14, wherein the control station includes an operator handle.

16. The controller system of claim 15, wherein the operator handle is an operator control handle.

17. The controller system of claim 16, wherein the capacitive sensor is mounted in the operator control handle, and wherein the capacitive sensor is arranged and configured to change capacitance when the operator control handle is touched by the operator.

18. The controller system of claim 17, wherein the control station includes three of the operator control handles and three of the capacitive sensors, each of the control handles having a respective one of the capacitive sensors mounted therein, and wherein each of the capacitive sensors is arranged and configured to change capacitance when the respective operator control handle is touched by the operator.

* * * * *